(12) United States Patent
Shirai et al.

(10) Patent No.: US 6,218,982 B1
(45) Date of Patent: Apr. 17, 2001

(54) DISTANCE MEASUREMENT APPARATUS

(75) Inventors: Noriaki Shirai; Yoshiaki Hoashi, both of Kariya; Takeshi Matsui, Toyohashi, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/418,603

(22) Filed: Oct. 15, 1999

(30) Foreign Application Priority Data

Oct. 16, 1998 (JP) .................................................. 10-295667

(51) Int. Cl.⁷ ....................................................... G01S 13/26
(52) U.S. Cl. ........................ 342/118; 342/127; 342/128; 342/145
(58) Field of Search .................................. 342/118, 127, 342/128, 145

(56) References Cited

U.S. PATENT DOCUMENTS

| | | | |
|---|---|---|---|
| 5,151,702 | * | 9/1992 | Urkowitz ............................. 342/134 |
| 5,731,781 | * | 3/1998 | Reed .................................... 342/135 |
| 6,031,485 | * | 2/2000 | Cellai et al. ......................... 342/131 |

FOREIGN PATENT DOCUMENTS

| | | |
|---|---|---|
| 793357 | 9/1997 | (EP) . |
| 4-52585 | 2/1992 | (JP) . |
| 5-37378 | 2/1993 | (JP) . |
| 5-164844 | 6/1993 | (JP) . |
| 5-312950 | 11/1993 | (JP) . |
| 9-231202 | 9/1997 | (JP) . |
| 10-29363 | 1/1998 | (JP) . |

* cited by examiner

Primary Examiner—John B. Sotomayor
(74) Attorney, Agent, or Firm—Pillsbury Winthrop LLP

(57) ABSTRACT

A pseudo random noise code is generated synchronously with a reference clock signal. A first forward electromagnetic wave is transmitted in response to the pseudo random noise code. A first echo wave is received which is caused by reflection of the first forward electromagnetic wave at an object. The received first echo wave is converted into a binary signal. A value of a correlation between the binary signal and the pseudo random noise code is repetitively calculated at a predetermined period having a synchronous relation with the reference clock signal. A time interval taken by the first forward electromagnetic wave and the first echo wave to travel to and from the object is measured in response to a timing at which the calculated correlation value peaks. Then, a second forward electromagnetic wave is transmitted in response to a transmitted pulse signal is transmitted. A second echo wave related to the second forward electromagnetic wave is received. The received second echo wave is converted into a received pulse signal. A delay circuit defers the transmitted pulse signal by a delay time corresponding to the measured time interval to generate a delayed transmitted pulse signal. A phase difference between the received pulse signal and the delayed transmitted pulse signal is measured at a resolution higher than a resolution corresponding to the predetermined period of the correlation-value calculation. A distance to the object is calculated on the basis of the measured time interval and the measured phase difference.

5 Claims, 8 Drawing Sheets

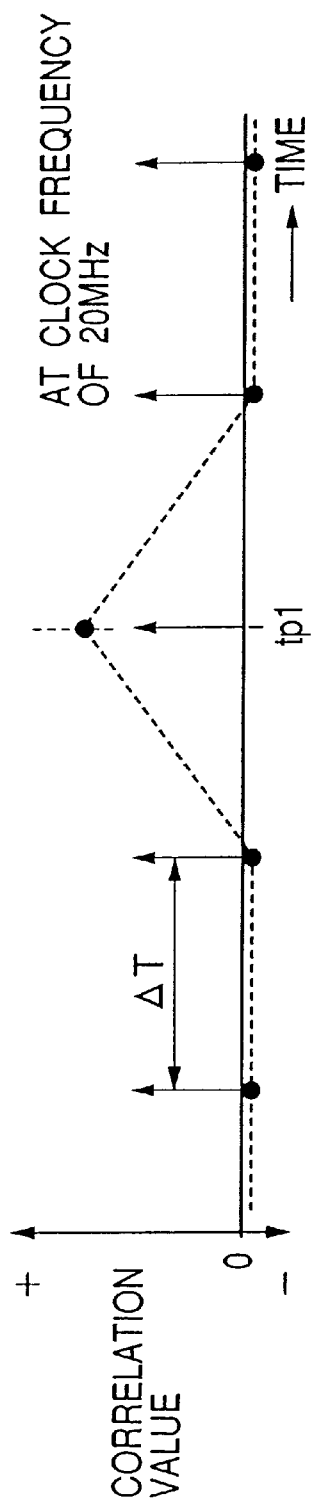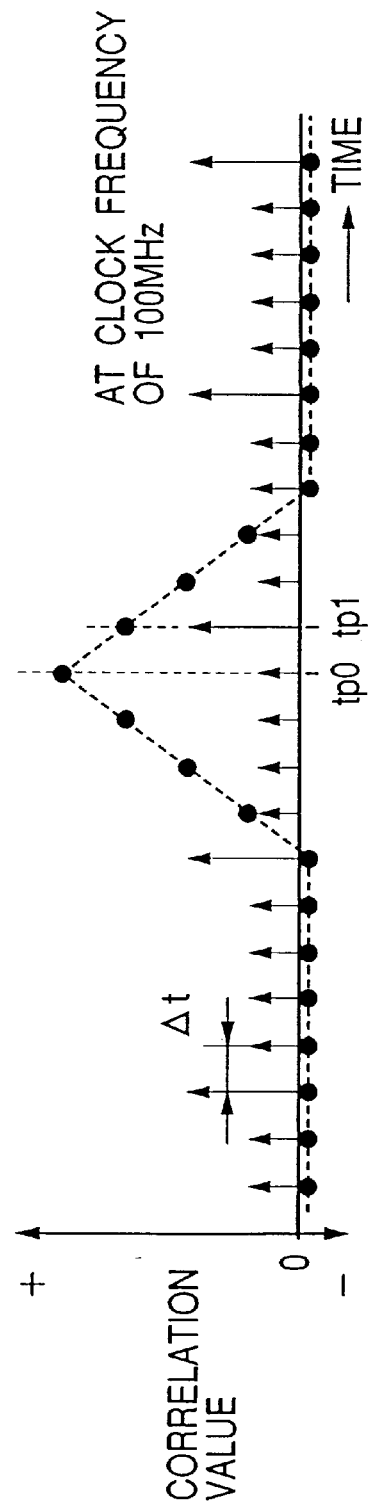

DISTANCE MEASUREMENT APPARATUS

BACKGROUND OF THE INVENTION

1. Field of the Invention

This invention relates to a distance measurement apparatus using an electromagnetic wave modulated in accordance with a pseudo random noise code.

2. Description of the Related Art

A prior-art distance measurement apparatus of a spread spectrum type which is mounted on an automotive vehicle measures the distance between the present vehicle and a preceding target object such as a preceding vehicle by using an electromagnetic wave modulated in accordance with a pseudo random noise code. Specifically, a beam of an electromagnetic wave whose amplitude is modulated in accordance with a pseudo random noise code of a predetermined bit length is emitted in a forward direction with respect to the body of the present vehicle. A moment of the transmission of the pseudo random noise code with the electromagnetic wave is memorized. The prior-art apparatus receives an echo beam caused by reflection of the forward electromagnetic-wave beam at a preceding target object. The received echo beam is converted into a binary echo electric signal. Calculation is made about the value of the correlation between the binary echo electric signal and the pseudo random noise code used for the modulation of the transmitted electromagnetic wave. A moment at which the calculated correlation value peaks is detected as a moment of the reception of the pseudo random noise code contained in the echo beam. The prior-art apparatus calculates the distance between the present vehicle and the preceding target object from the time interval between the moment of the transmission of the pseudo random noise code and the moment of the reception thereof, and also from the velocity of the electromagnetic wave.

In the prior-art apparatus, the pseudo random noise code has a sequence of bits, the number of which is predetermined. The correlation-value calculation is iterated at a period corresponding to one bit of the pseudo random noise code. Accordingly, the time interval between the moment of the transmission of the pseudo random noise code and the moment of the reception thereof is determined at a resolution corresponding to a 1-bit time interval (a 1-chip time interval). A resolution of the measured distance between the present vehicle and the preceding target depends on the resolution of the determination of the time interval. In the case where a clock frequency, the reciprocal of which corresponds to a 1-bit time interval, is equal to 20 MHz, the resolution of the measured distance between the present vehicle and the preceding target is equal to 7.5 m.

Japanese published unexamined patent application 5-312950 discloses a distance measurement apparatus which includes a maximum length code generator. A laser diode generates laser light modulated in accordance with a maximum length code produced by the maximum length code generator. A beam of the laser light is emitted toward an object. The apparatus of Japanese patent application 5-312950 includes a phase shifter which shifts the maximum length code by different values within a time interval corresponding to one bit of the maximum length code. The phase shifter outputs a plurality of shifted maximum length codes. The apparatus of Japanese patent application 5-312950 includes a photodiode which receives an echo beam caused by the reflection of the forward laser beam at the object. The photodiode converts the received echo beam into a corresponding echo electric signal. The values of the correlations between the echo electric signal and the shifted maximum length codes are calculated. The distance to the object is computed on the basis of the calculated correlation values.

Japanese published unexamined patent application 10-2963 discloses a distance measurement apparatus which uses an electromagnetic wave modulated in accordance with a pseudo random noise code. The apparatus of Japanese patent application 10-2963 includes a correlator which measures a time interval shorter than a 1-chip time interval (a 1-bit time interval) with respect to the pseudo random noise code.

SUMMARY OF THE INVENTION

It is an object of this invention to provide a distance measurement apparatus having a high resolution.

A first aspect of this invention provides a distance measurement apparatus comprising pseudo-random-noise-code generating means for generating a pseudo random noise code in synchronism with a reference clock signal, the pseudo random noise code having a predetermined bit length; transmitting means for transmitting a first forward electromagnetic wave modulated in accordance with the pseudo random noise code generated by the pseudo-random-noise-code generating means; receiving means for receiving a first echo wave caused by reflection of the first forward electromagnetic wave at an object, and converting the received first echo wave into a binary signal; correlation calculating means for repetitively calculating a value of a correlation between the binary signal generated by the receiving means and the pseudo random noise code used for modulation of the first forward electromagnetic wave by the transmitting means at a predetermined period having a synchronous relation with the reference clock signal; first time measuring means for detecting a timing at which the correlation value calculated by the correlation calculating means peaks, and measuring a time interval taken by the first forward electromagnetic wave and the first echo wave to travel to and from the object in response to the detected timing; transmitted-pulse generating means for, after the time interval has been measured by the first time measuring means, outputting a transmitted pulse signal to the transmitting means and causing the transmitting means to transmit a second forward electromagnetic wave modulated in accordance with the transmitted pulse signal, wherein the receiving means is operative for receiving a second echo wave caused by reflection of the second forward electromagnetic wave at the object, and converting the received second echo wave into a received pulse signal; transmitted-pulse delaying means for delaying the transmitted pulse signal generated by the transmitted-pulse generating means by a delay time corresponding to the time interval measured by the first time measuring means, and thereby converting the transmitted pulse signal into a delayed transmitted pulse signal; second time measuring means for measuring a phase difference between the received pulse signal generated by the receiving means and the delayed transmitted pulse signal generated by the transmitted-pulse delaying means at a resolution higher than a resolution corresponding to the predetermined period of the correlation-value calculation by the correlation calculating means; and distance calculating means for calculating a distance to the object on the basis of the time interval measured by the first time measuring means and the phase difference measured by the second time measuring means.

A second aspect of this invention is based on the first aspect thereof, and provides a distance measurement apparatus wherein the transmitted-pulse generating means operates for repetitively outputting the transmitted pulse signal a plurality of times, and the second time measuring means operates for measuring the phase difference in connection with each of the transmitted pulse signals, and wherein the distance calculating means comprises means for calculating an average of the phase differences measured by the second time measuring means, and means for calculating the distance to the object on the basis of the time interval measured by the first time measuring means and the calculated average of the phase differences.

A third aspect of this invention is based on the first aspect thereof, and provides a distance measurement apparatus wherein the delay time provided by the transmitted-pulse delaying means is equal to the time interval measured by the first time measuring means minus a time interval corresponding to the predetermined period of the correlation-value calculation by the correlation calculating means.

A fourth aspect of this invention is based on the first aspect thereof, and provides a distance measurement apparatus wherein the second time measuring means comprises a delay-element array for propagating the delayed transmitted pulse signal generated by the transmitted-pulse delaying means from its input end to its output end, the delay-element array having a series combination of a predetermined number of delay elements each providing a signal delay corresponding to shorter than the predetermined period of the correlation-value calculation by the correlation calculating means; means for detecting a number of delay elements in the delay-element array through which the transmitted pulse signal has already passed at a moment determined by the received pulse signal generated by the receiving means; and means for measuring the phase difference between the received pulse signal and the delayed transmitted pulse signal in response to the detected number of the delay elements.

A fifth aspect of this invention is based on the first aspect thereof, and provides a distance measurement apparatus wherein the correlation calculating means comprises means for multiplying a frequency of the reference clock signal to generate a frequency-multiplied clock signal, and means for repetitively calculating the value of the correlation between the binary signal and the pseudo random noise code in synchronism with the frequency-multiplied clock signal.

BRIEF DESCRIPTION OF THE DRAWINGS

FIG. 5 is a time-domain diagram of calculated correlation values in the apparatus of FIG. 1.

FIG. 6 is a time-domain diagram of calculated correlation values in the apparatus of FIG. 4.

DESCRIPTION OF THE PREFERRED EMBODIMENTS

First Embodiment

Figure 1:
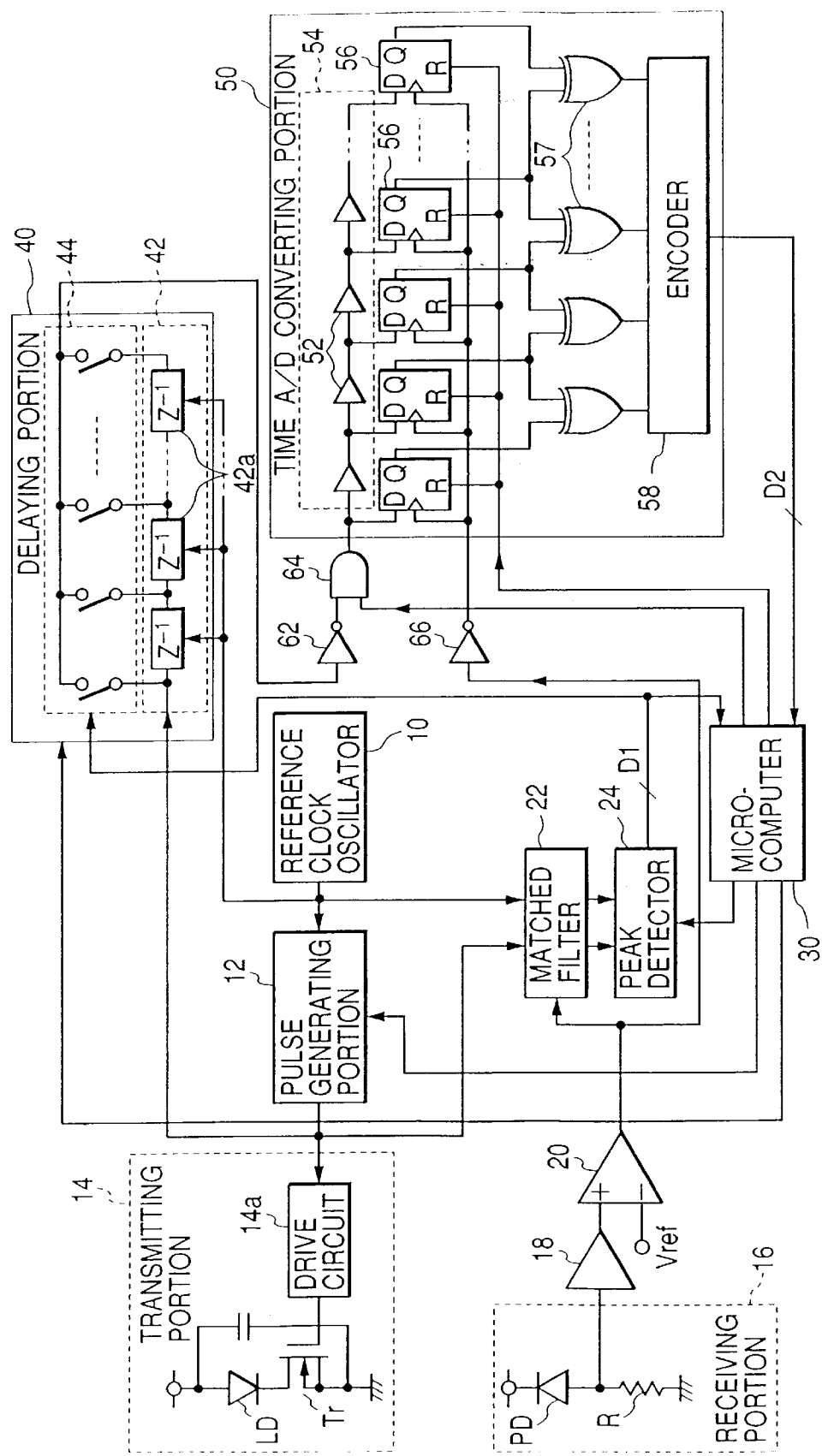
FIG. 1 is a diagram of a distance measurement apparatus according to a first embodiment of this invention.

FIG. 1 shows a distance measurement apparatus according to a first embodiment of this invention. The apparatus of FIG. 1 uses a spread spectrum technique. For example, the apparatus of FIG. 1 is mounted on an automotive vehicle, and operates to measure a distance between the present vehicle and a preceding target object such as a preceding vehicle.

The apparatus of FIG. 1 includes a reference clock oscillator (a reference clock signal generator) 10, a pulse generating portion 12, and a light emitting portion 14. The reference clock oscillator 10 generates a reference clock signal having a predetermined frequency, for example, 20 MHz. The pulse generating portion 12 receives the reference clock signal from the reference clock oscillator 10. The pulse generating portion 12 produces a pseudonoise (PN) code or a pulse signal in synchronism with the reference clock signal. The PN code has a predetermined bit length corresponding to, for example, about several tens of bits. The PN code is, for example, a maximum length code. The light emitting portion 14 receives the maximum length code or the pulse signal from the pulse generating portion 12. The light emitting portion 14 generates a beam of an electromagnetic wave subjected to amplitude modulation responsive to the maximum length code or the pulse signal. The light emitting portion 14 transmits the beam of the electromagnetic wave in a forward direction with respect to the body of the present vehicle. The amplitude modulation is, for example, intensity modulation. The beam of the electromagnetic wave is, for example, a beam of laser light.

The light emitting portion 14 includes a laser diode LD, a drive transistor Tr, and a drive circuit 14a. The laser diode LD operates to emit a laser beam in the forward direction with respect to the body of the present vehicle. The transistor Tr is interposed in a power feed line to the laser diode LD. The transistor Tr acts to activate and deactivate the laser diode LD, that is, to allow and inhibit the emission of the forward laser beam. The transistor Tr is, for example, an n-channel MOSFET. The drive circuit 14a receives the output signal (the maximum length code or the pulse signal) of the pulse generating portion 12. The drive circuit 14a is connected to the control electrode (the gate) of the transistor Tr. The drive circuit 14a turns on the transistor Tr when the output signal of the pulse generating portion 12 is in its high-level state. The drive circuit 14a turns off the transistor Tr when the output signal of the pulse generating portion 12 is in its low-level state.

In the case where the pulse generating portion 12 outputs the maximum length code, the drive circuit 14a turns on and off the transistor Tr in response to the logic states ("1" and "0") of bits of the maximum length code. In this case, the laser diode LD emits a forward laser beam subjected to intensity modulation responsive to the maximum length code.

In the case where the pulse generating portion 12 outputs a high-level signal as the pulse signal, the drive circuit 14a turns on the transistor Tr in response to the high-level signal. In this case, the laser diode LD emits a forward laser beam with a constant intensity for the duration of the high-level signal.

In the case where the light emitting portion 14 receives the maximum length code from the pulse generating portion 12, the amplitude of the forward laser beam emitted from the light emitting portion 14 is maximized when the logic state of the maximum length code is "1", and is minimized when the logic state of the maximum length code is "0". Thus, the forward laser beam is subjected to amplitude modulation responsive to the maximum length code.

The pulse generating portion 12 selectively produces the maximum length code or the pulse signal in response to a control signal fed from a microcomputer 30 which will be mentioned later.

The apparatus of FIG. 1 includes a light receiving portion 16, an amplifier 18, and a comparator 20. The forward laser beam outputted from the light emitting portion 14 is reflected by a preceding target object such as a preceding vehicle. The reflection of the forward laser beam at the preceding target object causes an echo beam which returns toward the apparatus. The light receiving portion 16 receives an echo beam, and converts the received echo beam into a received signal. The light receiving portion 16 feeds the received signal to the amplifier 18. The device 18 amplifies the received signal. The amplifier 18 outputs the amplification-resultant signal to the comparator 20. The comparator 20 receives a predetermined reference voltage Vref. The device 20 compares the output signal of the amplifier 18 with the reference voltage Vref, thereby converting the output signal of the amplifier 18 into a binary signal. Specifically, the comparator 20 outputs a high level when the voltage of the output signal of the amplifier 18 exceeds the reference voltage Vref. The comparator 20 outputs a low level when the voltage of the output signal of the amplifier 18 is equal to or lower than the reference voltage Vref. The comparator 20 outputs the binary signal to a matched filter 22.

The light receiving portion 16 includes a resistor R and a photodiode PD. The photodiode PD is connected via the resistor R to a power feed line in a reverse bias state. When an echo beam is incident to the photodiode PD, a photo-caused current flows therethrough. The resistor R converts the photo-caused current into a voltage signal which is outputted to the preamplifier 18 as a received signal.

The light receiving portion 16, the amplifier 18, and the comparator 20 compose a receiving means.

The matched filter 22 receives the reference clock signal from the reference clock oscillator 10. The matched filter 22 operates in response to the reference clock signal. The matched filter 22 receives the maximum length code from the pulse generating portion 12. The matched filter 22 latches the maximum length code as a transmitted code. As previously mentioned, the matched filter 22 is fed with the binary signal from the comparator 30. The matched filter 22 accepts the binary signal in synchronism with the reference clock signal. The matched filter 22 periodically latches the binary signal as a received code for a time period corresponding to the bit length of the transmitted code. The matched filter 22 calculates a correlation between the latched transmitted code and the latched received code which is periodically updated in response to the reference clock signal. The matched filter 22 acts as a correlation calculating means.

The matched filter 22 uses a known way of calculating a correlation. In the calculation of the correlation by the matched filter 22, a correlation value is computed for every corresponding bits of the latched transmitted code and the latched received code. The correlation value is set to "1" for corresponding bits where the logic state of the latched transmitted code and the logic state of the latched received code are equal to each other. The correlation value is set to "−1" for corresponding bits where the logic state of the latched transmitted code and the logic state of the latched received code are different from each other. The correlation values for the respective bits are summed into an integrated correlation value which corresponds to the whole of the latched received code. An integrated correction value is available each time the latched received code is updated.

The matched filter 22 informs a peak detector 24 of every integrated correlation value. The matched filter 22 contains a device for counting pulses of the reference clock signal to generate information of a calculation time at which every integrated correction value is available. The calculation time is equal to the lapse of time from the start of calculation of an integrated correlation value between the latched transmitted code and the first latched received code. The matched filter 22 informs the peak detector 24 of every calculation time. The peak detector 24 detects a moment (a peak-occurrence moment) at which the integrated correlation value calculated by the matched filter 22 is maximized. In other words, the peak detector 24 detects the time interval between the moment of the start of the correlation-value calculation by the matched filter 22 and a moment at which the integrated correlation value is maximized. The peak detector 24 informs the microcomputer 30 of the detection result, that is, the peak-occurrence moment relative to the calculation starting moment (the time interval between the calculation starting moment and the peak-occurrence moment). The signal representing the detected relative peak-occurrence moment is referred to as first time data D1. The peak detector 24 acts as a first time measuring means.

The microcomputer 30 includes a combination of an interface, a CPU, a ROM, and a RAM. The microcomputer 30 operates in accordance with a program stored in the ROM. The microcomputer 30 calculates the distance between the present vehicle and the preceding target object (the preceding vehicle) by using the first time data D1 fed from the peak detector 24.

The apparatus of FIG. 1 has a feature that reduces an error in the D1-based calculated distance between the present vehicle and the preceding target object. This feature will be explained hereinafter. The pulse generating portion 12 is controlled by the microcomputer 30 to generate a signal composed of only a single high-level pulse having a duration equal to one period of the reference clock signal. The single-pulse signal is fed from the pulse generating portion 12 to the light emitting portion 14 as a transmitted single-pulse signal. The light emitting portion 14 emits a forward laser beam in response to the single-pulse signal. The forward laser beam is reflected at the preceding target object, and hence an echo beam is caused which returns to the light receiving portion 16. The light receiving portion 16 converts the echo beam into an echo electric signal. The echo electric signal is fed from the light receiving portion 16 to the comparator 20 via the amplifier 18. The comparator 20 converts the echo electric signal into a received single-pulse signal. The phase difference between the transmitted single-pulse signal and the received single-pulse signal is measured at a resolution (corresponding to 1 nsec or shorter) higher than the resolution of the time calculation by the matched filter 22. It should be noted that the resolution of the time calculation by the matched filter 22 is determined by the period $\Delta T$ of the calculation by the matched filter 22. The microcomputer 30 is informed of the measured phase difference. The signal representing the measured phase difference is referred to as second time data D2. The microcomputer 30 corrects an error of the first time data D1 in response to the second time data D2.

In connection with the above-mentioned feature, the apparatus of FIG. 1 includes a delaying portion 40 and a time A/D (analog-to-digital) converting portion 50. The delaying portion 40 is fed with the transmitted single-pulse signal from the pulse generating portion 12. In addition, the delaying portion 40 receives the first time data D1 from the peak detector 24. Furthermore, the delaying portion 40 receives the reference clock signal from the reference clock oscillator 10. The microcomputer 30 informs the delaying portion 40 of the period ΔT of the calculation by the matched filter 22. The delaying portion 40 is controlled by the microcomputer 30 to delay the transmitted single-pulse signal by a time Td1 equal to the time interval denoted by the first time data D1 minus the period ΔT of the calculation by the matched filter 22. Specifically, Td1=D1−ΔT. The time A/D converting portion 50 receives the delayed transmitted single-pulse signal from the delaying portion 40. The time A/D converting portion 50 receives the binary signal (the received single-pulse signal) from the comparator 20. The time A/D converting portion 50 measures the phase difference between the delayed transmitted single-pulse signal and the received single-pulse signal at a resolution higher than the resolution of the time calculation by the matched filter 22. The time A/D converting portion 50 acts as a second time measuring means.

The delaying portion 40 includes a shift register 42 and a selector 44. The shift register 42 receives the transmitted single-pulse signal from the pulse generating portion 12. The shift register 42 receives the reference clock signal from the reference clock oscillator 10. The shift register 42 delays the transmitted single-pulse signal in synchronism with the reference clock signal. The shift register 42 has a signal propagation line formed by a series or cascade combination of delay elements ($Z^{-1}$ elements) 42a and provided with taps. The selector 44 receives the first time data D1 from the peak detector 24. The selector 44 selects one of the taps in response to the first time data D1 and a control signal fed from the microcomputer 30. The control signal contains information of the period ΔT of the calculation by the matched filter 22. The selector 44 transmits a signal from the selected tap to a later stage as a delayed transmitted single-pulse signal. In other words, the delaying portion 40 outputs the delayed transmitted single-pulse signal to the later stage. The signal delay provided by the delaying portion 40 depends on which of the taps is selected. The signal delay provided by the delaying portion 41 is set, by the microcomputer 30, equal to the time Td1 (see FIG. 2). It should be noted that Td1=D1−ΔT. Since the delay time Td1 is equal to the time interval denoted by the first time data D1 minus the period ΔT of the calculation by the matched filter 22, the delayed transmitted single-pulse signal reaches the time A/D converting portion 50 before the received single-pulse signal appears in the output signal of the comparator 20.

The delayed transmitted single-pulse signal can be fed from the delaying portion 40 to the time A/D converting portion 50 via an inverter 62 and an AND circuit 64 as a signal for starting measurement related to the second time data D2. The received single-pulse signal is fed from the comparator 20 to the time A/D converting portion 50 via an inverter 66 as a signal for stopping the measurement related to the second time data D2. The microcomputer 30 can output a high-level signal to the AND circuit 64 as a signal for permitting the measurement related to the second time data D2. When the microcomputer 30 outputs the high-level signal to the AND circuit 64, the AND circuit 64 is open so that the measurement starting signal can be inputted to the time A/D converting portion 50.

The time A/D converting portion 50 includes a delay buffer array 54. The delay buffer array 54 has a line along which the measurement starting signal fed via the AND circuit 64 can be propagated. The signal propagation line in the delay buffer array 54 is formed by a series combination (a cascade combination) of a predetermined number "m" of delay elements 52, and is provided with taps. Preferably, the delay elements 52 are equal in structure. Each of the delay elements 52 includes, for example, a buffer circuit. Each of the delay circuits 52 provides a predetermined signal delay equal to or shorter than 1 nsec. The taps in the signal propagation line are connected to the D input terminals of "m+1" D flip-flops 56, respectively. The clock input terminals of the D flip-flops 56 are subjected to the measurement stopping signal fed via the inverter 66. The D flip-flops 56 latch signals at the respective taps in synchronism with a rising edge in the measurement stopping signal. The time A/D converting portion 50 includes "m" Exclusive-OR circuits 57. The Q̄ output terminals of the first and second D flip-flops 56 are connected to input terminals of the first Exclusive-OR circuit 57, respectively. The Q̄ output terminals of the second and third D flip-flops 56 are connected to input terminals of the second Exclusive-OR circuit 57, respectively. Similarly, the later D flip-flops 56 are connected to the later Exclusive-OR circuits 57. The Q̄ output terminals of the second last D flip-flop 56 and the last D flip-flop 56 are connected to input terminals of the last Exclusive-OR circuit 57, respectively. The Exclusive-OR circuits 57 receive the latched signals from the D flip-flops 56. Each of the Exclusive-OR circuits 57 executes Exclusive-OR operation between the two received signals. In the time A/D converting portion 50, the Exclusive-OR circuits 57 are followed by an encoder 58. The device 58 encodes the output signals of the Exclusive-OR circuits 57 into the second time data D2. The encoder 58 is designed to detect the position of an Exclusive-OR circuit among the Exclusive-OR circuits 57 which outputs a high-level signal. The detected position of the Exclusive-OR circuit which outputs the high-level signal indicates the phase difference between the delayed transmitted single-pulse signal and the received single-pulse signal. The time A/D converting portion 50 outputs the second time data D2 to the microcomputer 30. The D flip-flops 56 have respective reset terminals R connected to the microcomputer 30. The D flip-flops 56 can be reset by a reset signal applied to the reset terminals R from the microcomputer 30.

Figure 2:
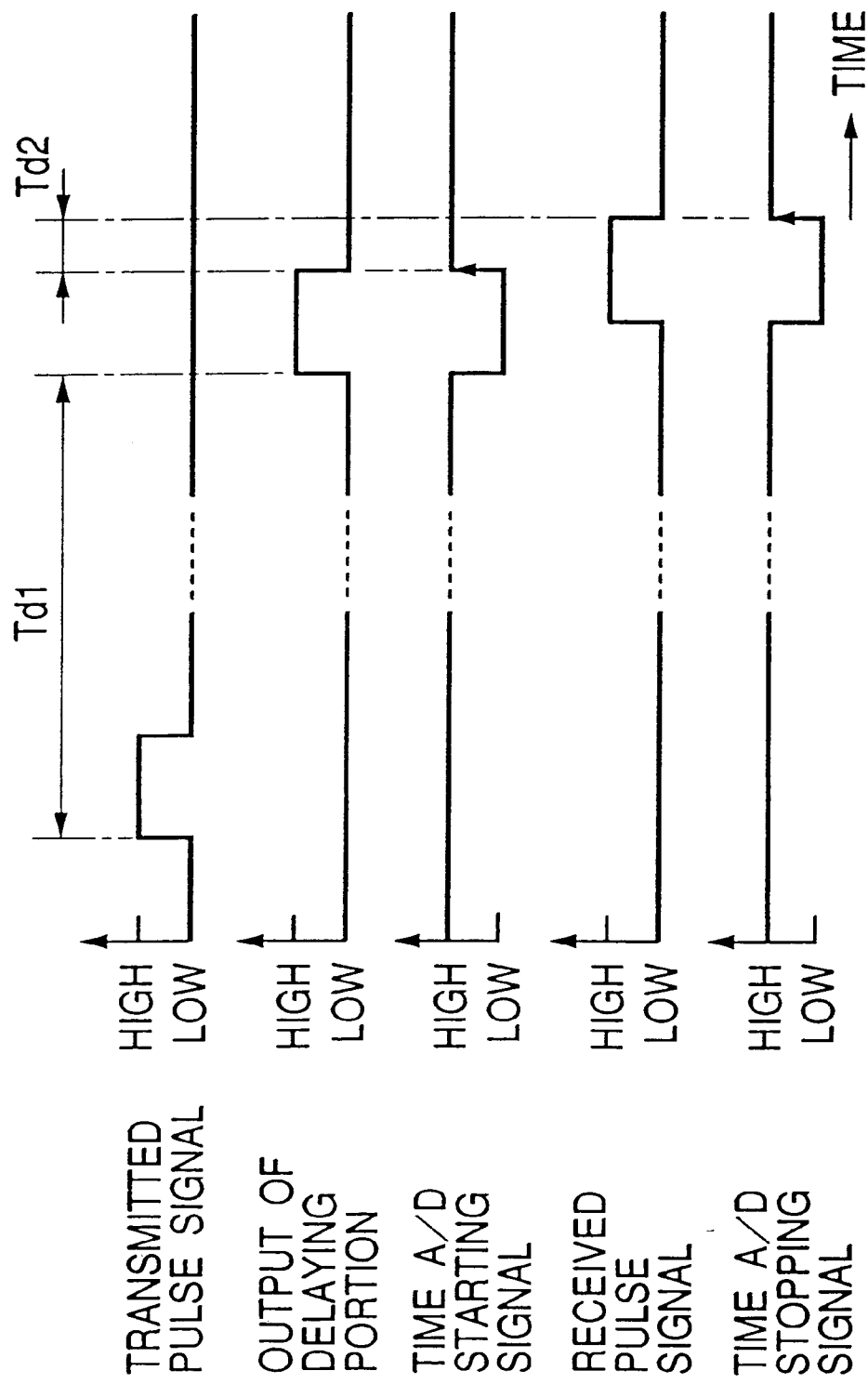
FIG. 2 is a time-domain diagram of signals in the apparatus of FIG. 1.

With reference to FIG. 2, when the delayed transmitted single-pulse signal which is outputted from the delaying portion 40 changes from a high level to a low level, the signal inputted into the time A/D converting portion 50 from the AND circuit 64 changes from a low level to a high level. The low-to-high change in the signal inputted into the time A/D converting portion 50 from the AND circuit 64 is a measurement starting signal. The low-to-high signal change is propagated successively through the delay elements 52 in the time A/D converting portion 50 while being delayed thereby. When the output signal of the comparator 20 changes from a high level to a low level in response to a received single-pulse signal, the signal inputted into the time A/D converting portion 50 from the inverter 66 changes from a low level to a high level. The low-to-high change in the signal inputted into the time A/D converting portion 50 from the inverter 66 is a measurement stopping signal. The D flip-flops 56 latch signals at the respective taps in the delay buffer array 54 in response to the low-to-high change in the output signal of the inverter 66. Each of the Exclusive-OR circuits 57 executes Exclusive-OR operation between two related signals among the latched signals outputted from the D flip-flops 56. The device 58 encodes the output signals of the Exclusive-OR circuits 57 into the second time data D2. Specifically, the encoder 58 detects the position of an Exclusive-OR circuit among the Exclusive-OR circuits 57 which outputs a high-level signal.

In the time A/D converting portion 50, the first Exclusive-OR circuit 57 receives the latched signals from the first and second D flip-flops 56 which correspond to the input signal and the output signal with respect to the first delay element 52 respectively. The second Exclusive-OR circuit 57 receives the latched signals from the second and third D flip-flops 56 which correspond to the input signal and the output signal with respect to the second delay element 52 respectively. Similarly, the later Exclusive-OR circuits 57 receive the latched signals from the later D flip-flops 56 which correspond to the input signals and the output signals with respect to the later delay elements 52. The last Exclusive-OR circuit 57 receives the latched signals from the second last D flip-flop 56 and the last D flip-flop 56 which correspond to the input signal and the output signal with respect to the last delay element 52 respectively. Accordingly, the Exclusive-OR circuits 57 detect a delay element among the delay elements 52 about which the input signal and the output signal are different in logic state. Also, the Exclusive-OR circuits 57 detect a delay element among the delay elements 52 about which the input signal and the output signal are equal in logic state.

As shown in FIG. 2, the signal inputted into the time A/D converting portion 50 from the AND circuit 64 remains in a low-level state during a relatively long time interval before the occurrence of the low-to-high change. Accordingly, the output signals of all the delay elements 52 are in low-level states immediately before the signal inputted into the time A/D converting portion 50 from the AND circuit 64 changes from the low level to the high level. A change in the output signal of each of the delay elements 52 follows a change in the input signal thereinto by a time interval equal to the delay time provided thereby. In accordance with the lapse of time since the moment of the occurrence of the low-to-high change in the signal inputted into the time A/D converting portion 50 from the AND circuit 64 (the measurement starting signal), the delay element about which the input signal and the output signal are different in logic state move from the first delay element 52 toward the last delay element 52. Also, in accordance with the lapse of time since the moment of the occurrence of the low-to-high change in the signal inputted into the time A/D converting portion 50 from the AND circuit 64, the number of delay elements about which the input signals and the output signals are in high-level states (that is, the number of delay elements through which the low-to-high signal change or the measuring starting signal has already passed) increases. The D flip-flops 56 allow detection of the position of the delay element about which the input signal and the output signal are different, and also detection of the number of delay elements about which the input signals and the output signals are in high-level states at the moment of the occurrence of the low-to-high change in the signal inputted into the time A/D converting portion 50 from the inverter 66 (the measurement stopping signal). It should be noted that the number of delay elements about which the input signals and the output signals are in high-level states means the number of delay elements through which the low-to-high signal change or the measuring starting signal has already passed. The device 58 encodes the output signals of the Exclusive-OR circuits 57 into a signal representing the detected position of the delay element about which the input signal and the output signal are different, and also the detected number of delay elements through which the low-to-high signal change or the measuring starting signal has already passed. The encoder 58 outputs the encoding-resultant signal to the microcomputer 30 as the second time data D2. The time interval Td2 between the moment of the feed of the measurement starting signal to the time A/D converting portion 50 and the moment of the feed of the measurement stopping signal thereto, that is, the phase difference Td2 between the delayed transmitted single-pulse signal and the received single-pulse signal, can be calculated from the detected number of delay elements through which the low-to-high signal change or the measuring starting signal has already passed (or the detected position of the delay element about which the input signal and the output signal are different) and also the delay time provided by each of the delay elements 52. Since the delay time provided by each of the delay elements 52 is equal to or shorter than 1 nsec, the second time data D2 indicates the phase difference Td2 between the delayed transmitted single-pulse signal and the received single-pulse signal at a resolution corresponding to 1 nsec or shorter.

The delay buffer array 54 in the time A/D converting portion 50 serves as a group of delay elements composing a second time measuring means. The D flip-flops 56, the Exclusive-OR circuits 57, and the encoder 58 compose a delay-element-number detecting means.

Figure 3:
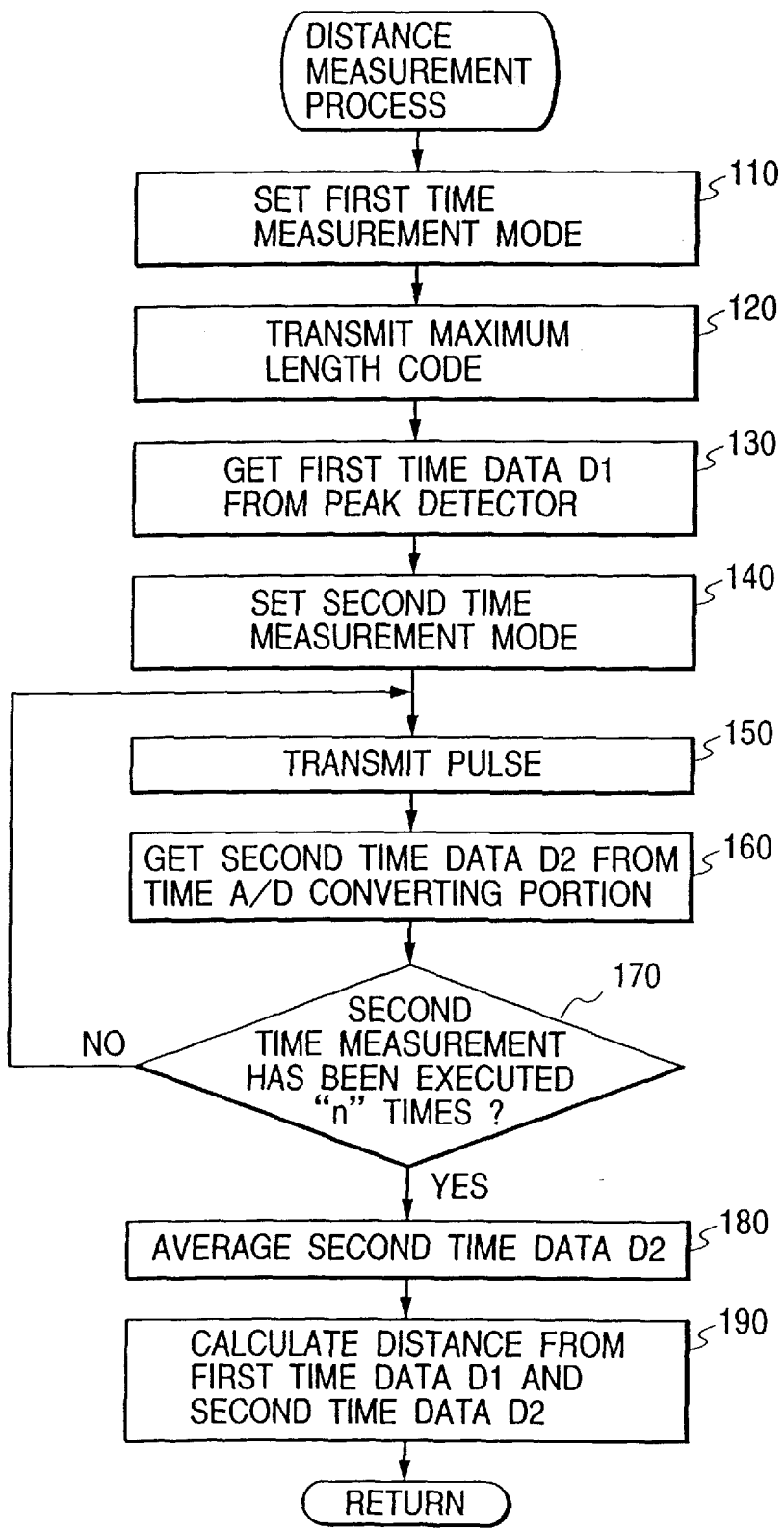
FIG. 3 is a flowchart of a distance measuring segment of a program for a microcomputer in FIG. 1.

The microcomputer 30 implements a distance measurement process which will be explained hereinafter. As previously indicated, the microcomputer 30 operates in accordance with a program stored in its internal ROM. FIG. 3 is a flowchart of a segment of the program which relates to the distance measurement process. The program segment in FIG. 3 is executed for every predetermined time interval.

As shown in FIG. 3, a first step 110 of the program segment outputs a low-level signal to the AND circuit 64. The low-level signal closes the AND circuit 64 so that a measurement starting signal will be inhibited from entering the time A/D converting portion 50. The step 110 initializes the peak detector 24 so that the peak detector 24 can detect a peak of the correlation value reported by the matched filter 22 during a later stage. Accordingly, the step 110 sets operation of the apparatus of FIG. 1 in a first time measurement mode.

A step 120 following the step 110 controls the pulse generating portion 12 to produce a maximum length code having a predetermined bit length. The step 120 and the pulse generating portion 12 cooperate as a pseudo random noise code generating means. The pulse generating portion 12 outputs the maximum length code to the light emitting portion 14. The light emitting portion 14 outputs a forward laser beam whose amplitude is modulated in accordance with the maximum length code.

In the presence of a preceding target object (a preceding vehicle), the forward laser beam is reflected thereat and causes an echo beam which returns to the apparatus. The light receiving portion 16 converts the echo beam into a received signal. The received signal is fed from the light receiving portion 16 to the comparator 20 via the amplifier 18. The comparator 20 converts the received signal into a binary signal. The comparator 20 feeds the binary signal to the matched filter 22. When the binary signal reflects the echo beam, the value of the correlation calculated by the matched filter 22 increases. The peak detector 24 detects a moment (a peak-occurrence moment) at which the correlation value calculated by the matched filter 22 is maximized. In other words, the peak detector 24 detects the time interval between the moment of the start of the correlation-value calculation by the matched filter 22 and a moment at which the calculated correlation value is maximized. The peak detector 24 outputs first time data D1 which represents the peak-occurrence moment relative to the start of the correlation-value calculation by the matched filter 22 (that is, the time interval between the moment of the start of the correlation-value calculation by the matched filter 22 and the peak-occurrence moment).

A step 130 subsequent to the step 120 waits until the peak detector 24 outputs the first time data D1. Then, the step 130 receives the first time data D1 from the peak detector 24.

A step 140 following the step 130 outputs a reset signal to the time A/D converting portion 50 to reset the D flip-flops 56 therein. The D flip-flops 56 output low-level signals when being reset. The step 140 calculates a time Td1 equal to the time interval denoted by the first time data D1 minus the period $\Delta T$ of the calculation by the matched filter 22 according to the equation "Td1 =D1–$\Delta T$". The step 140 outputs a control signal to the delaying portion 40 so that the signal delay provided by the delaying portion 40 will be equal to the calculated time Td1. The step 140 outputs a high-level signal to the AND circuit 64. The high-level signal opens the AND circuit 64 so that a measurement starting signal will be permitted to enter the time A/D converting portion 50. Accordingly, the step 140 sets operation of the apparatus of FIG. 1 in a second time measurement mode. After the step 140, the program advances to a step 150.

The step 150 controls the pulse generating portion 12 to produce a signal composed of only a single high-level pulse having a duration equal to one period of the reference clock signal. The pulse generating portion 12 outputs the single-pulse signal as a transmitted single-pulse signal. The step 150 and the pulse generating portion 12 cooperate as a transmitted pulse generating means.

The pulse generating portion 12 feeds the transmitted single-pulse signal to the light emitting portion 14. The light emitting portion 14 emits a forward laser beam in response to the transmitted single-pulse signal. Also, the pulse generating portion 12 outputs the transmitted single-pulse signal to the delaying portion 40. The device 40 delays the transmitted single-pulse signal by a time equal to the time Td1. The delayed transmitted single-pulse signal travels from the delaying portion 40 to the time A/D converting portion 50 via the inverter 62 and the AND circuit 64. The delayed transmitted single-pulse signal is inputted into the time A/D converting portion 50 as a measurement starting signal. On the other hand, the forward laser beam emitted from the light emitting portion 14 is reflected at the preceding target object, and hence an echo beam is caused which returns to the light receiving portion 16. The light receiving portion 16 converts the echo beam into a received signal. The received signal is fed from the light receiving portion 16 to the comparator 20 via the amplifier 18. The comparator 20 converts the received signal into a binary signal which is a received single-pulse signal. The received single-pulse signal travels from the comparator 20 to the time A/D converting portion 50 via the inverter 66. The received single-pulse signal is inputted into the time A/D converting portion 50 as a measurement stopping signal. The time A/D converting portion 50 detects the phase difference between the measurement starting signal and the measurement stopping signal, and generates and outputs second time data D2 representing the detected phase difference.

A step 160 subsequent to the step 150 waits until the time A/D converting portion 50 outputs the second time data D2. Then, the step 160 receives the second time data D2 from the time A/D converting portion 50.

A step 170 following the step 160 determines whether or not the number of times of the execution of the measurement to generate second time data D2 reaches a predetermined number "n". When the number of times reaches the predetermined number "n", the program advances from the step 170 to a step 180. Otherwise, the program returns from the step 170 to the step 150. Accordingly, there are provided "n" detected phase differences represented by the second time data D2 before the step 180 is executed.

The step 180 calculates the average or mean of the "n" detected phase differences represented by the second time data D2. The steps 170 and 180 suppress a measurement error in the second time data D2.

A step 190 subsequent to the step 180 calculates the distance between the present vehicle and the preceding target object (the preceding vehicle) from the time interval represented by the first time data D1 and the time interval corresponding to the mean detected phase difference related to the second time data D2. After the step 190, the current execution cycle of the program segment ends.

Specifically, the step 190 calculates the time interval corresponding to the mean detected phase difference related to the second time data D2. The step 190 adds the time interval represented by the first time data D1 and the time interval corresponding to the mean detected phase difference. The step 190 subtracts the period $\Delta T$ of the calculation by the matched filter 22 from the addition result. The subtraction result is equal to the time interval taken by the laser beam to travel back and forth between the present vehicle and the preceding target object (the preceding vehicle). The step 190 calculates the distance between the present vehicle and the preceding target object from the subtraction result and the velocity of the laser beam.

As previously mentioned, the apparatus of FIG. 1 which is mounted on the present vehicle emits a forward laser beam whose amplitude is modulated in accordance with a maximum length code. The apparatus of FIG. 1 receives an echo beam caused by the reflection of the forward laser beam at a preceding target object such as a preceding vehicle. In the apparatus of FIG. 1, the received echo beam is converted into a received maximum length code. The value of the correlation between the transmitted maximum length code and the received maximum length code is periodically calculated. The time interval taken by the laser beam to travel back and forth between the present vehicle and the preceding target object is measured by referring to the calculated correlation values. The measured time interval is represented by the first time data D1. Then, the apparatus of FIG. 1 emits a forward laser beam in response to a single-pulse signal. The apparatus of FIG. 1 receives an echo beam caused by the reflection of the forward laser beam at the preceding target object. In the apparatus of FIG. 1, the received echo beam is converted into a received single-pulse signal. The transmitted single-pulse signal is delayed by a time corresponding to the time interval represented by the first time data D1. The phase difference between the delayed transmitted single-pulse signal and the received single-pulse signal is measured by the time A/D converting portion 50. The measured phase difference is represented by the second time data D2. The distance between the present vehicle and the preceding target object (the preceding vehicle) is calculated from the measured time interval represented by the first time data D1 and the measured phase difference represented by the second time data D2.

The resolution of the inter-vehicle distance measured by the apparatus in FIG. 1 is determined by the delay time provided by each of the delay elements 52 in the time A/D converting portion 50. The delay time provided by each of the delay circuits 52 is equal to or shorter than 1 nsec. In the case where the delay time is equal to 1 nsec, the distance measurement resolution corresponds to 15 cm. Thus, the distance measurement resolution is remarkably higher than a distance measurement resolution available in a comparative design where the inter-vehicle distance is measured by referring to only the first time data D1. Accordingly, the apparatus in FIG. 1 is able to accurately measure the distance between the present vehicle and a preceding target object (a preceding vehicle).

The delaying portion 40 and the time A/D converting portion 50 can be formed by an inexpensive digital IC or IC's. Accordingly, the cost of the apparatus in FIG. 1 is not significantly higher than that of a prior-art apparatus.

In the apparatus of FIG. 1, the first time data D1 which represents the measured time interval is generated in a spread spectrum technique using a maximum length code. The second time data D2 which represents the phase difference between the delayed transmitted single-pulse signal and the received single-pulse signal is used in compensating for a low resolution of or an error in the measured time interval represented by the first time data D1. Since the spread spectrum technique is used, the measured distance between the present vehicle and a preceding target object (a preceding vehicle) is able to resist noise.

In the apparatus of FIG. 1, there are provided "n" detected phase differences represented by the second time data D2. Then, the calculation is made as to the average or mean of the "n" detected phase differences represented by the second time data D2. The mean detected phase difference related to the second time data D2 is used in the distance calculation. The above-indicated averaging process enables the measured distance to further resist noise.

Second Embodiment

A second embodiment of this invention is similar to the first embodiment thereof except for design changes mentioned hereinafter. The second embodiment of this invention periodically learns the delay time provided by each of the delay elements 52. For example, the second embodiment of this invention implements the learning during every process of generating the first time data D1.

Specifically, the learning is implemented as follows. At a timing of a rising edge in the reference clock signal, a starting signal is inputted into the time A/D converting portion 50. At a timing of a subsequent falling edge in the reference clock signal, a stopping signal is inputted into the time A/D converting portion 50. Thus, a time interval corresponding to a 1-pulse width of the reference clock signal is measured by the time A/D converting portion 50. The delay time provided by each of the delay elements 52 is calculated from the measurement result (the number of delay elements 52 through which the starting signal has passed) and the actual value of a 1-pulse width of the reference clock signal.

In the second embodiment of this invention, the measured distance between the present vehicle and a preceding target object (a preceding vehicle) is corrected in response to the calculated delay time provided by each of the delay elements 52. Accordingly, it is possible to compensate for a temperature-dependent variation in the actual delay time provided by each of the delay elements 52.

Third Embodiment

Figure 4:
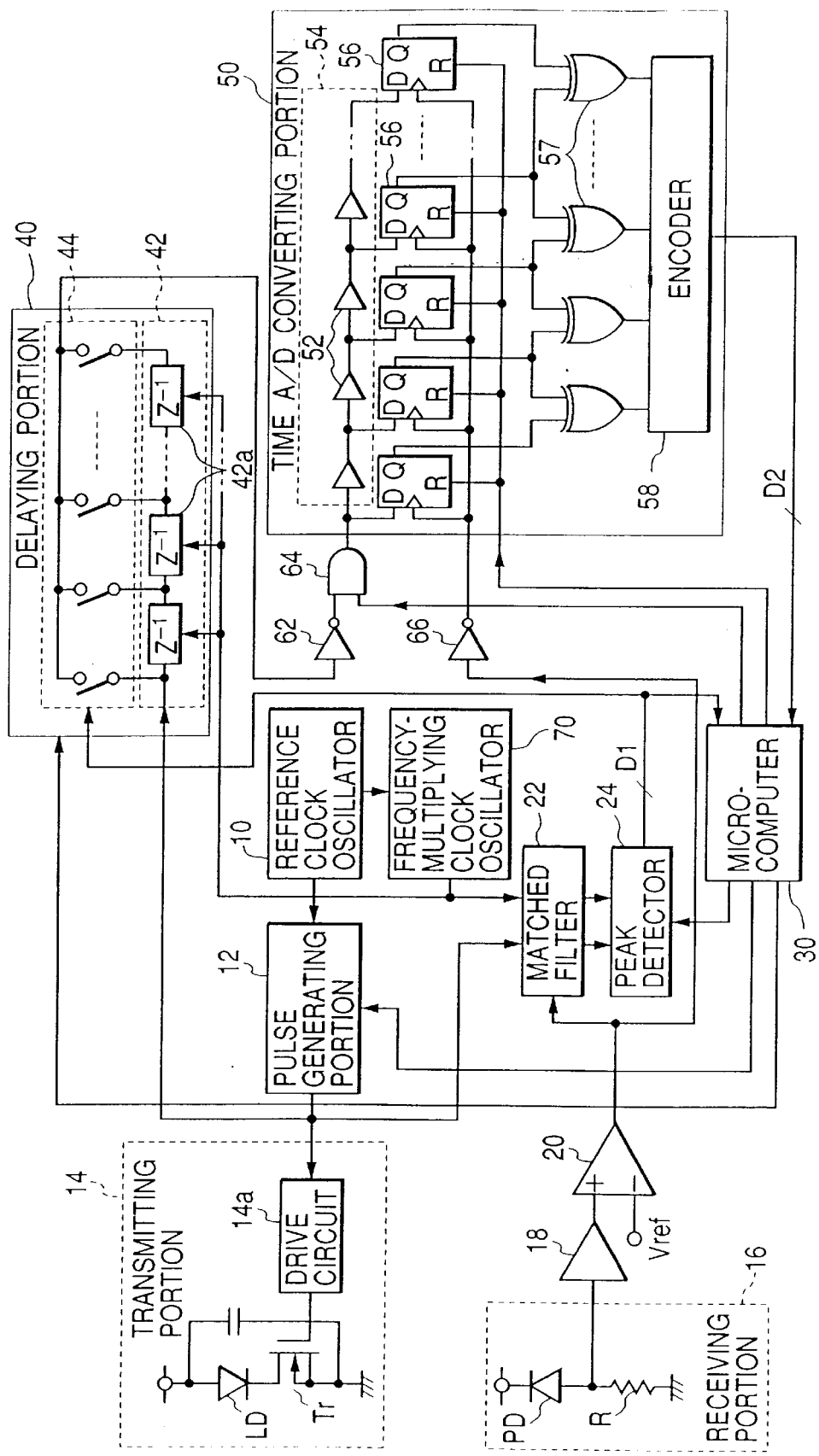
FIG. 4 is a diagram of a distance measurement apparatus according to a third embodiment of this invention.

FIG. 4 shows a third embodiment of this invention which is similar to the first embodiment or the second embodiment thereof except for design changes mentioned hereinafter. As shown in FIG. 4, the third embodiment of this invention includes a frequency-multiplying clock oscillator 70 which receives the reference clock signal from the reference clock oscillator 10. The frequency-multiplying clock oscillator 70 multiplies the frequency of the reference clock signal by 5, and thereby generates a second clock signal (a frequency-multiplied clock signal) having a frequency of, for example, 100 MHz.

The frequency-multiplying clock oscillator 70 outputs the second clock signal to the matched filter 22 and the delaying portion 40. The matched filter 22 operates in response to the second clock signal rather than the reference clock signal. Also, the delaying portion 40 operates in response to the second clock signal rather than the reference clock signal.

FIG. 5 shows correlation values calculated by the matched filter 22 in the first embodiment of this invention. FIG. 6 shows correlation values calculated by the matched filter 22 in the third embodiment of this invention. As shown in FIGS. 5 and 6, the period At of the correlation-value calculation by the matched filter 22 in the third embodiment of this invention is equal to one fifth of the corresponding period $\Delta T$ in the first embodiment of this invention. Thus, the third embodiment of this invention more accurately detects a moment tp0 at which the value of the correction between a transmitted maximum length code and a received maximum length code peaks than the first embodiment of this invention detects a corresponding moment tp1.

In the third embodiment of this invention, the matched filter 22 operates in response to the second clock signal which has a frequency equal to five times the frequency of the reference clock signal. The peak detector 24 which acts to generate the first time data D1 operates on the results of the calculation by the matched filter 22. Thus, the resolution of the measured time interval represented by the first time data D1 in the third embodiment of this invention is higher than that provided in the first embodiment of this invention by a factor of 5. The resolution of the measured time interval represented by the first time data D1 in the third embodiment of this invention corresponds to, for example, 1.5 m.

As previously indicated, the matched filter 22 operates in response to the second clock signal. The peak detector 24 which acts to generate the first time data D1 operates on the results of the calculation by the matched filter 22. The delaying portion 40 operates in response to the second clock signal. Thus, the resolution of the delay time provided by the delaying portion 40 agrees with the resolution of the measured time interval represented by the first time data D1.

Fourth Embodiment

Figure 7:
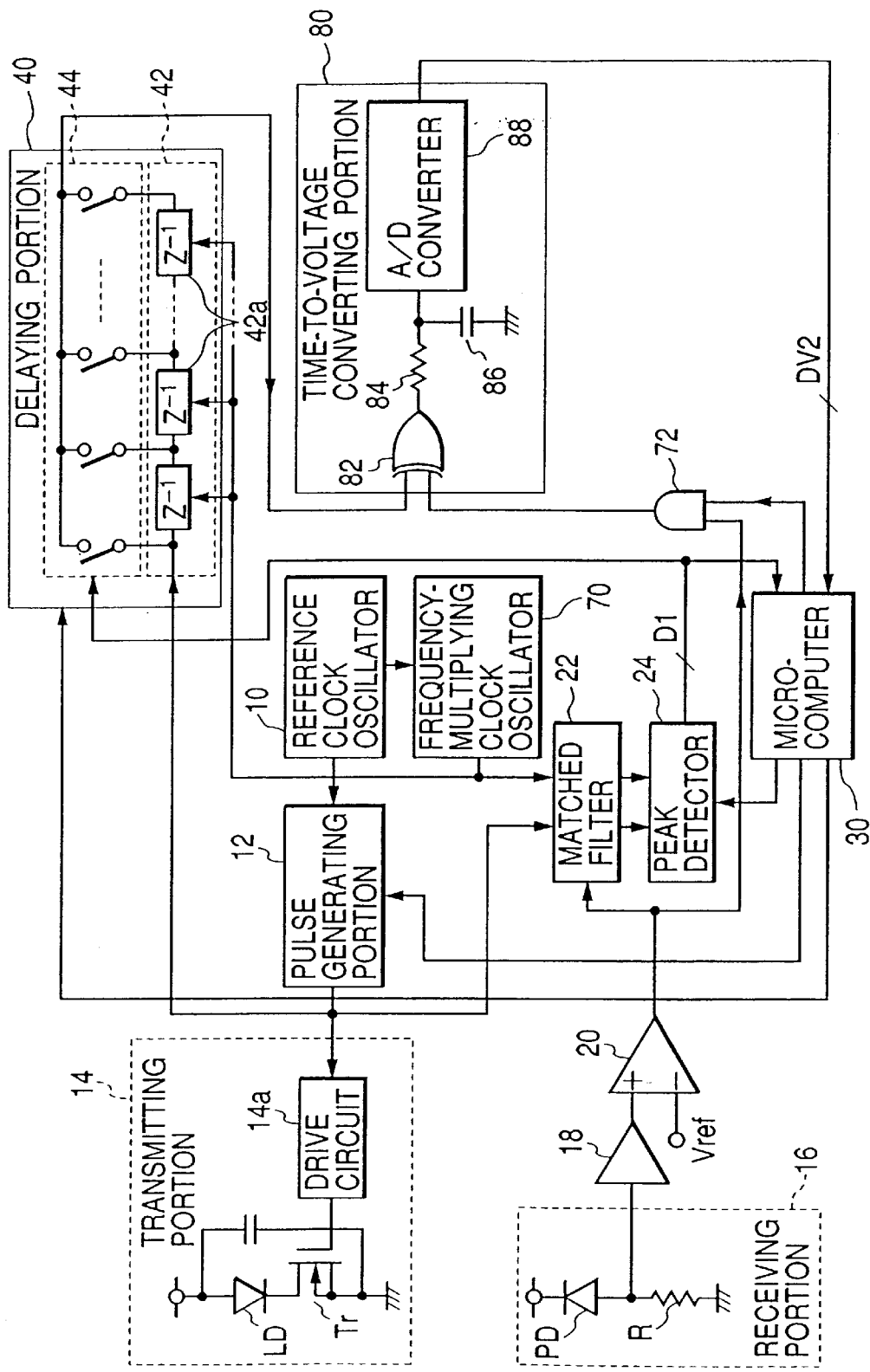
FIG. 7 is a diagram of a distance measurement apparatus according to a fourth embodiment of this invention.

FIG. 7 shows a distance measurement apparatus according to a fourth embodiment of this invention. The apparatus in FIG. 7 is similar to the apparatus in FIG. 4 except for design changes mentioned hereinafter. The apparatus in FIG. 7 includes a time-to-voltage converting portion 80 which replaces the time A/D converting portion 50 (see FIGS. 1 and 4). The time-to-voltage converting portion 80 detects the phase difference between the delayed transmitted single-pulse signal outputted from the delaying portion 40 and the received single-pulse signal outputted from the comparator 20. Specifically, the time-to-voltage converting portion 80 converts the phase difference between the delayed transmitted single-pulse signal and the received single-pulse signal into a signal voltage. Then, the time-to-voltage converting portion 80 converts the signal voltage into a digital signal DV2. The time-to-voltage converting portion 80 outputs the digital signal DV2 to the microcomputer 30. The digital signal DV2 represents the detected phase difference between the delayed transmitted single-pulse signal and the received single-pulse signal. The microcomputer 30 generates second time data D2 in response to the digital signal DV2.

The time-to-voltage converting portion 80 includes an Exclusive-OR circuit 82, an integration circuit, and an A/D (analog-to-digital) converter 88. The integration circuit includes a combination of a resistor 84 and a capacitor 86. The delayed transmitted single-pulse signal is applied from the delaying portion 40 to a first input terminal of the Exclusive-OR circuit 82. The received single-pulse signal is propagated from the comparator 20 to a second input terminal of the Exclusive-OR circuit 82 via an AND circuit 72. The Exclusive-OR circuit 82 executes Exclusive-OR operation between the delayed transmitted single-pulse signal and the received single-pulse signal. The integration circuit follows the Exclusive-OR circuit 82. The integration circuit integrates an output signal of the Exclusive-OR circuit 82 into a signal voltage. The A/D converter 88 receives the signal voltage from the integration circuit. The A/D converter 88 changes the signal voltage into the digital signal DV2. The A/D converter 88 outputs the digital signal DV2 to the microcomputer 30.

The AND circuit 72 is closed and opened in response to a control signal fed from the microcomputer 30. When the AND circuit 72 is closed, the signal transmission from the comparator 20 to the time-to-voltage converting portion 80 is inhibited. When the AND circuit 72 is opened, the signal transmission from the comparator 20 to the time-to-voltage converting portion 80 is permitted. The microcomputer 30 controls the AND circuit 72 to implement the following prevention process. During the time interval from the moment of the generation of the single-pulse signal by the pulse generating portion 12 to the moment of the application of the delayed transmitted single-pulse signal to the Exclusive-OR circuit 82 in the time-to-voltage converting portion 80, a high-level signal outputted by the comparator 20 is prevented from reaching the Exclusive-OR circuit 82. If such a high-level signal reaches the Exclusive-OR circuit 82, the signal voltage generated by the integration circuit would be inaccurate.

Figure 8:
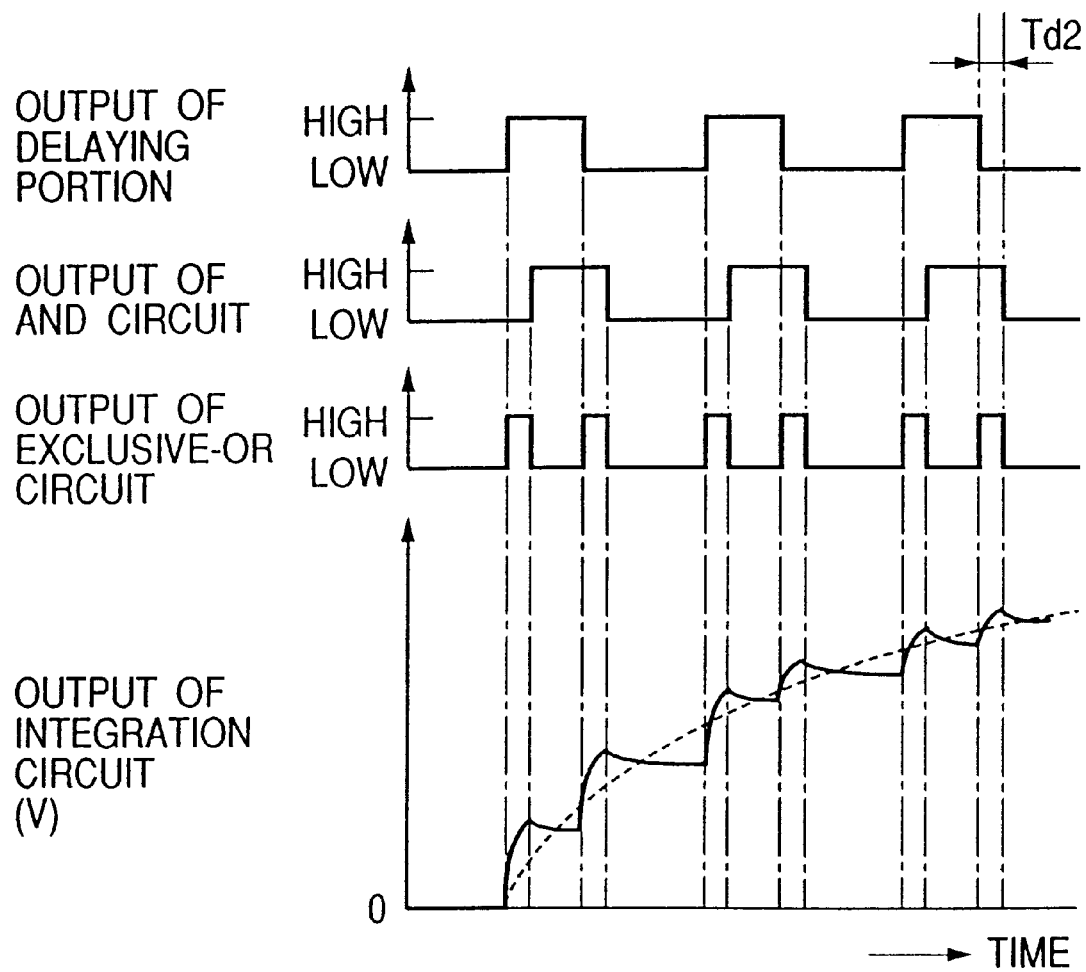
FIG. 8 is a time-domain diagram of signals in the apparatus of FIG. 7.

As will be made clear later, the microcomputer 30 controls the pulse generating portion 12 to repetitively produce a single-pulse signal at a predetermined period. Thus, the pulse generating portion 12 outputs a train of a predetermined number of single-pulse signals. Therefore, as shown in FIG. 8, the delaying portion 40 repetitively outputs a delayed transmitted single-pulse signal to the time-to-voltage converting portion 80 at the predetermined period. As shown in FIG. 8, the AND circuit 72 repetitively outputs a received single-pulse signal to the time-to-voltage converting portion 80. Each received single-pulse signal follows the corresponding delayed transmitted single-pulse signal but partially overlaps therewith in time base.

Every time interval for which a delayed transmitted single-pulse signal and a corresponding received single-pulse signal remain different in logic state is equal to the phase difference therebetween. Only during every time interval for which a delayed transmitted single-pulse signal and a corresponding received single-pulse signal remain different in logic state, the Exclusive-OR circuit 82 in the time-to-voltage converting portion 80 outputs a high-level signal to the integration circuit. The capacitor 86 in the integration circuit is charged by the high-level signal outputted from the Exclusive-OR circuit 82. The capacitor 86 is discharged at a small rate in response to a low-level signal outputted from the Exclusive-OR circuit 82. The voltage across the capacitor 86, that is, the signal voltage outputted from the integration circuit, rises as delayed transmitted single-pulse signals and received single-pulse signals are sequentially inputted into the time-to-voltage converting portion 80 (see FIG. 8). As previously mentioned, the A/D converter 88 receives the signal voltage from the integration circuit. The A/D converter 88 changes the signal voltage into the digital signal DV2. The A/D converter 88 outputs the digital signal DV2 to the microcomputer 30.

Figure 9:
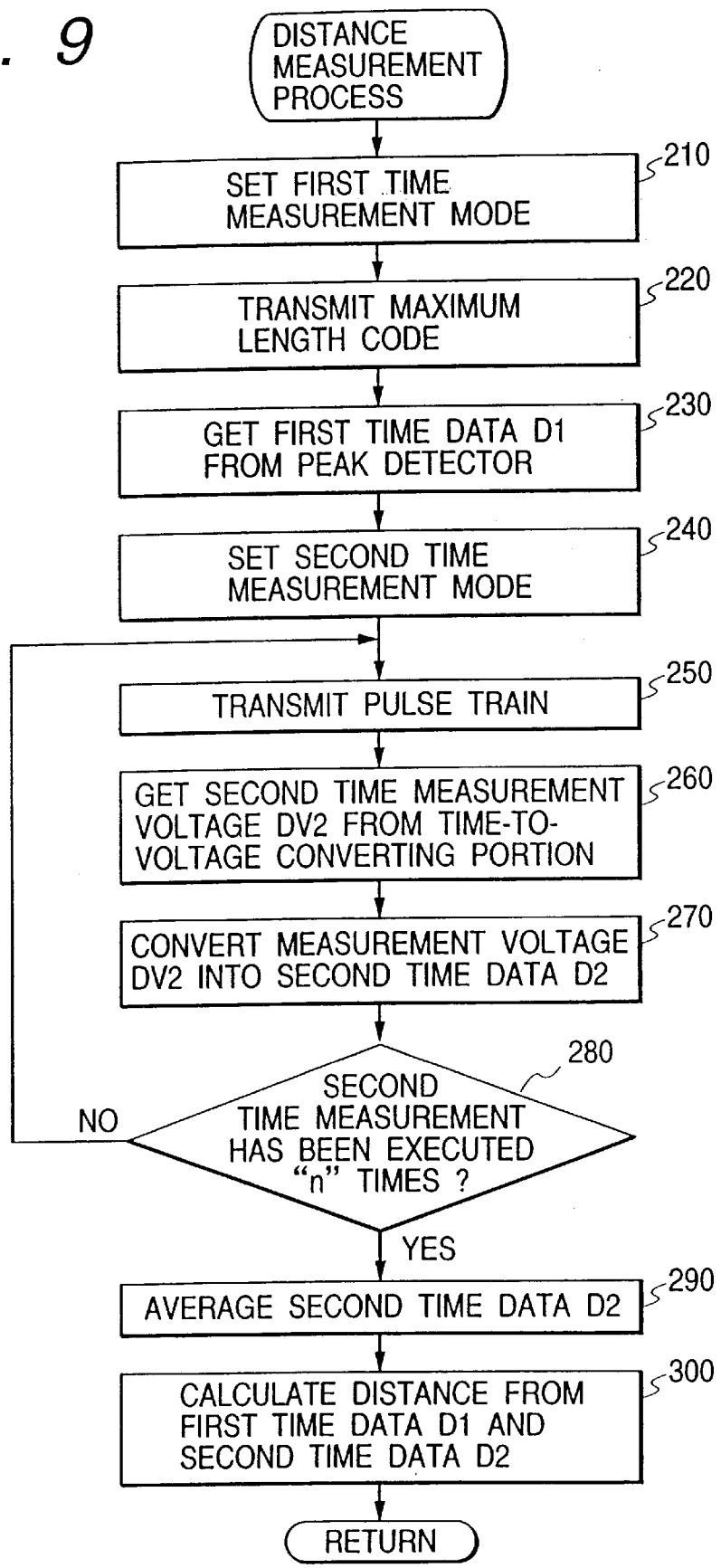
FIG. 9 is a flowchart of a distance measuring segment of a program for a microcomputer in FIG. 7.

The microcomputer 30 implements a distance measurement process which will be explained hereinafter. The microcomputer 30 operates in accordance with a program stored in its internal ROM. FIG. 9 is a flowchart of a segment of the program which relates to the distance measurement process. The program segment in FIG. 9 is executed for every predetermined time interval.

As shown in FIG. 9, a first step 210 of the program segment outputs a low-level signal to the AND circuit 72. The low-level signal closes the AND circuit 72 so that every received single-pulse signal (every high-level signal) will be inhibited from entering the time-to-voltage converting portion 80. The step 210 initializes the peak detector 24. Accordingly, the step 210 sets operation of the apparatus of FIG. 7 in a first time measurement mode.

A step 220 following the step 210 controls the pulse generating portion 12 to produce a maximum length code having a predetermined bit length. The pulse generating portion 12 outputs the maximum length code to the light emitting portion 14. The light emitting portion 14 outputs a forward laser beam whose amplitude is modulated in accordance with the maximum length code.

In the presence of a preceding target object (a preceding vehicle), the forward laser beam is reflected thereat and causes an echo beam which returns to the apparatus. The light receiving portion 16 converts the echo beam into a received signal. The received signal is fed from the light receiving portion 16 to the comparator 20 via the amplifier 18. The comparator 20 converts the received signal into a binary signal. The comparator 20 feeds the binary signal to the matched filter 22. When the binary signal reflects the echo beam, the value of the correlation calculated by the matched filter 22 increases. The peak detector 24 detects a moment (a peak-occurrence moment) at which the correlation value calculated by the matched filter 22 is maximized. In other words, the peak detector 24 detects the time interval between the moment of the start of the correlation-value calculation by the matched filter 22 and a moment at which the calculated correlation value is maximized. The peak detector 24 outputs first time data D1 which represents the peak-occurrence moment relative to the start of the correlation-value calculation by the matched filter 22 (that is, the time interval between the moment of the start of the correlation-value calculation by the matched filter 22 and the peak-occurrence moment).

A step 230 subsequent to the step 220 waits until the peak detector 24 outputs the first time data D1. Then, the step 230 receives the first time data D1 from the peak detector 24.

A step 240 following the step 230 calculates a time Td1 equal to the time interval denoted by the first time data D1 minus the period $\Delta T$ of the calculation by the matched filter 22 according to the equation "Td1=D1−$\Delta T$". The step 240 outputs a control signal to the delaying portion 40 so that the signal delay provided by the delaying portion 40 will be equal to the calculated time Td1. The step 240 outputs a high-level signal to the AND circuit 72. The high-level signal opens the AND circuit 72 so that every received single-pulse signal (every high-level signal) will be permitted to enter the time-to-voltage converting portion 80. Accordingly, the step 240 sets operation of the apparatus of FIG. 7 in a second time measurement mode. After the step 240, the program advances to a step 250.

The step 250 controls the pulse generating portion 12 to produce a train of single-pulse signals which has a predetermined period. The pulse generating portion 12 outputs the train of the single-pulse signals as a train of transmitted single-pulse signals.

The pulse generating portion 12 feeds the train of the transmitted single-pulse signals to the light emitting portion 14. The light emitting portion 14 emits a forward laser beam in response to the train of the transmitted single-pulse signals. Also, the pulse generating portion 12 outputs the train of the transmitted single-pulse signals to the delaying portion 40. The device 40 delays each transmitted single-pulse signal by a time equal to the time Td1. Each delayed transmitted single-pulse signal is propagated from the delaying portion 40 to the time-to-voltage converting portion 80. On the other hand, the forward laser beam emitted from the light emitting portion 14 is reflected at the preceding target object, and hence an echo beam is caused which returns to the light receiving portion 16. The light receiving portion 16 converts the echo beam into a received signal. The received signal is fed from the light receiving portion 16 to the comparator 20 via the amplifier 18. The comparator 20 converts the received signal into a binary signal which is a train of received single-pulse signals. Each received single-pulse signal travels from the comparator 20 to the time-to-voltage converting portion 80 via the AND circuit 72. The time-to-voltage converting portion 80 detects the phase difference between the train of the delayed transmitted single-pulse signals and the train of the received single-pulse signals. The time-to-voltage converting portion 80 generates and outputs the digital signal DV2 which represents the detected phase difference.

A step 260 subsequent to the step 250 waits until the time-to-voltage converting portion 80 outputs an effective digital signal DV2. Then, the step 260 receives the effective digital signal DV2 from the time-to-voltage converting portion 80.

A step 270 following the step 260 converts the digital signal DV2 into second time data D2 representing the phase difference (the time interval) between the train of the delayed transmitted single-pulse signals and the train of the received single-pulse signals. The ROM within the microcomputer 30 stores data indicating a predetermined map for the conversion from the digital signal DV2 into the second time data D2. Preferably, the map is designed to follow a nonlinear relation between the parameters represented by the digital signal DV2 and the second time data D2.

A step 280 subsequent to the step 270 determines whether or not the number of times of the execution of the measurement to generate second time data D2 reaches a predetermined number "n". When the number of times reaches the predetermined number "n", the program advances from the step 280 to a step 290. Otherwise, the program returns from the step 280 to the step 250. Accordingly, there are provided "n" detected phase differences represented by the second time data D2 before the step 290 is executed.

The step 290 calculates the average or mean of the "n" detected phase differences represented by the second time data D2. The steps 280 and 290 suppress a measurement error in the second time data D2.

A step 300 subsequent to the step 290 calculates the distance between the present vehicle and the preceding target object (the preceding vehicle) from the time interval represented by the first time data D1 and the time interval corresponding to the mean detected phase difference related to the second time data D2. After the step 300, the current execution cycle of the program segment ends.

What is claimed is:

1. A distance measurement apparatus comprising:

pseudo-random-noise-code generating means for generating a pseudo random noise code in synchronism with a reference clock signal, the pseudo random noise code having a predetermined bit length;

transmitting means for transmitting a first forward electromagnetic wave modulated in accordance with the pseudo random noise code generated by the pseudo-random-noise-code generating means;

receiving means for receiving a first echo wave caused by reflection of the first forward electromagnetic wave at an object, and converting the received first echo wave into a binary signal;

correlation calculating means for repetitively calculating a value of a correlation between the binary signal generated by the receiving means and the pseudo random noise code used for modulation of the first forward electromagnetic wave by the transmitting means at a predetermined period having a synchronous relation with the reference clock signal;

first time measuring means for detecting a timing at which the correlation value calculated by the correlation calculating means peaks, and measuring a time interval taken by the first forward electromagnetic wave and the first echo wave to travel to and from the object in response to the detected timing;

transmitted-pulse generating means for, after the time interval has been measured by the first time measuring means, outputting a transmitted pulse signal to the transmitting means and causing the transmitting means to transmit a second forward electromagnetic wave modulated in accordance with the transmitted pulse signal, wherein the receiving means is operative for receiving a second echo wave caused by reflection of the second forward electromagnetic wave at the object, and converting the received second echo wave into a received pulse signal;

transmitted-pulse delaying means for delaying the transmitted pulse signal generated by the transmitted-pulse generating means by a delay time corresponding to the time interval measured by the first time measuring means, and thereby converting the transmitted pulse signal into a delayed transmitted pulse signal;

second time measuring means for measuring a phase difference between the received pulse signal generated by the receiving means and the delayed transmitted pulse signal generated by the transmitted-pulse delaying means at a resolution higher than a resolution corresponding to the predetermined period of the correlation-value calculation by the correlation calculating means; and distance calculating means for calculating a distance to the object on the basis of the time interval measured by the first time measuring means and the phase difference measured by the second time measuring means.

2. A distance measurement apparatus according to claim 1, wherein the transmitted-pulse generating means operates for repetitively outputting the transmitted pulse signal a plurality of times, and the second time measuring means operates for measuring the phase difference in connection with each of the transmitted pulse signals, and wherein the distance calculating means comprises means for calculating an average of the phase differences measured by the second time measuring means, and means for calculating the distance to the object on the basis of the time interval measured by the first time measuring means and the calculated average of the phase differences.

3. A distance measurement apparatus according to claim 1, wherein the delay time provided by the transmitted-pulse delaying means is equal to the time interval measured by the first time measuring means minus a time interval corresponding to the predetermined period of the correlation-value calculation by the correlation calculating means.

4. A distance measurement apparatus according to claim 1, wherein the second time measuring means comprises:

a delay-element array for propagating the delayed transmitted pulse signal generated by the transmitted-pulse delaying means from its input end to its output end, the delay-element array having a series combination of a predetermined number of delay elements each providing a signal delay corresponding to shorter than the predetermined period of the correlation-value calculation by the correlation calculating means;

means for detecting a number of delay elements in the delay-element array through which the transmitted pulse signal has already passed at a moment determined by the received pulse signal generated by the receiving means; and means for measuring the phase difference between the received pulse signal and the delayed transmitted pulse signal in response to the detected number of the delay elements.

5. A distance measurement apparatus according to claim 1, wherein the correlation calculating means comprises means for multiplying a frequency of the reference clock signal to generate a frequency-multiplied clock signal, and means for repetitively calculating the value of the correlation between the binary signal and the pseudo random noise code in synchronism with the frequency-multiplied clock signal.

* * * * *